July 17, 1962 C. E. BRANICK 3,044,748
DEVICE FOR INVERTING PNEUMATIC TIRE CASINGS
Filed June 13, 1960 4 Sheets-Sheet 1

INVENTOR.
CHARLES E. BRANICK
BY
Merchant & Merchant
ATTORNEYS

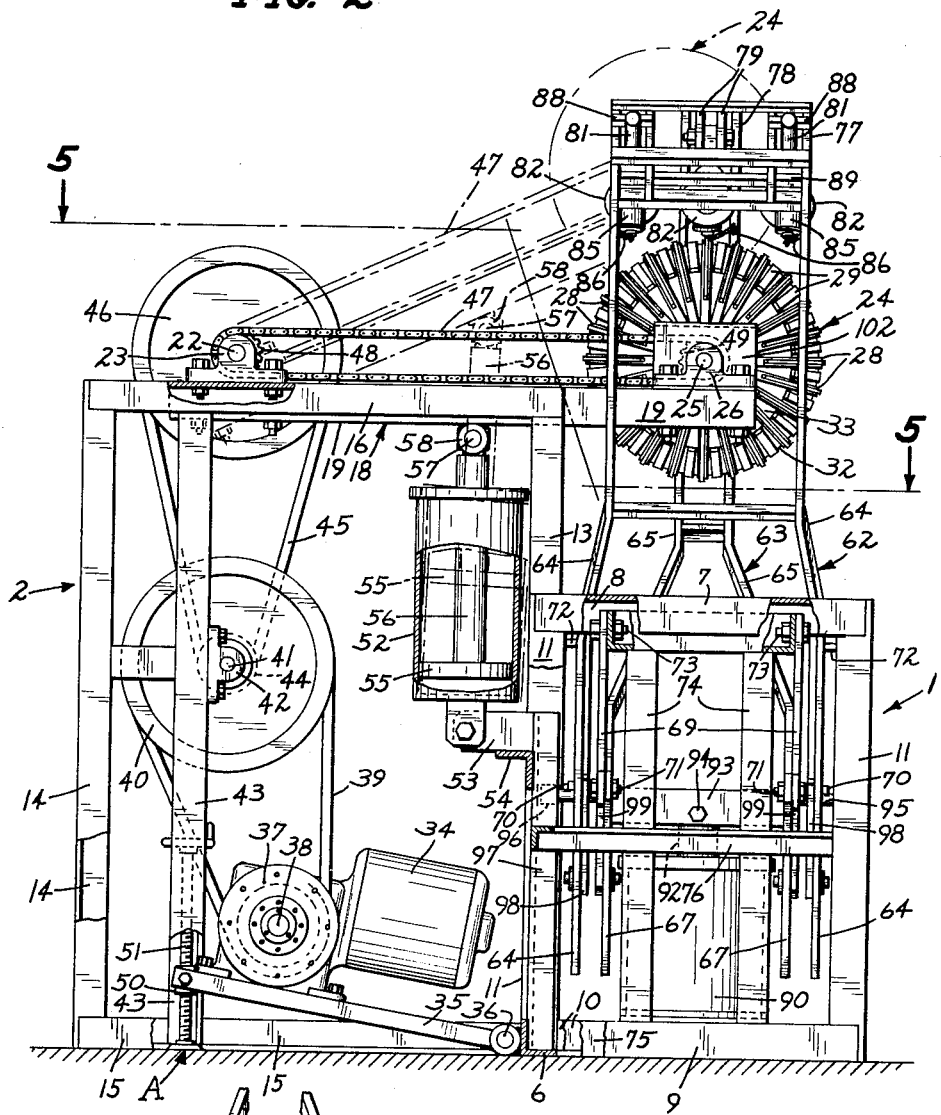

July 17, 1962 C. E. BRANICK 3,044,748
DEVICE FOR INVERTING PNEUMATIC TIRE CASINGS
Filed June 13, 1960 4 Sheets-Sheet 3
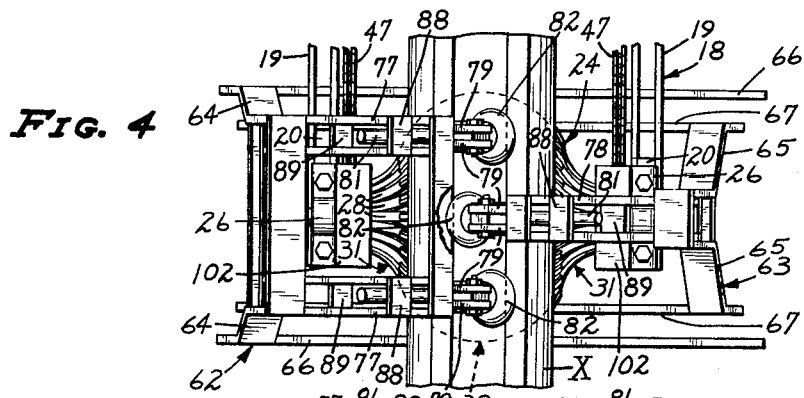
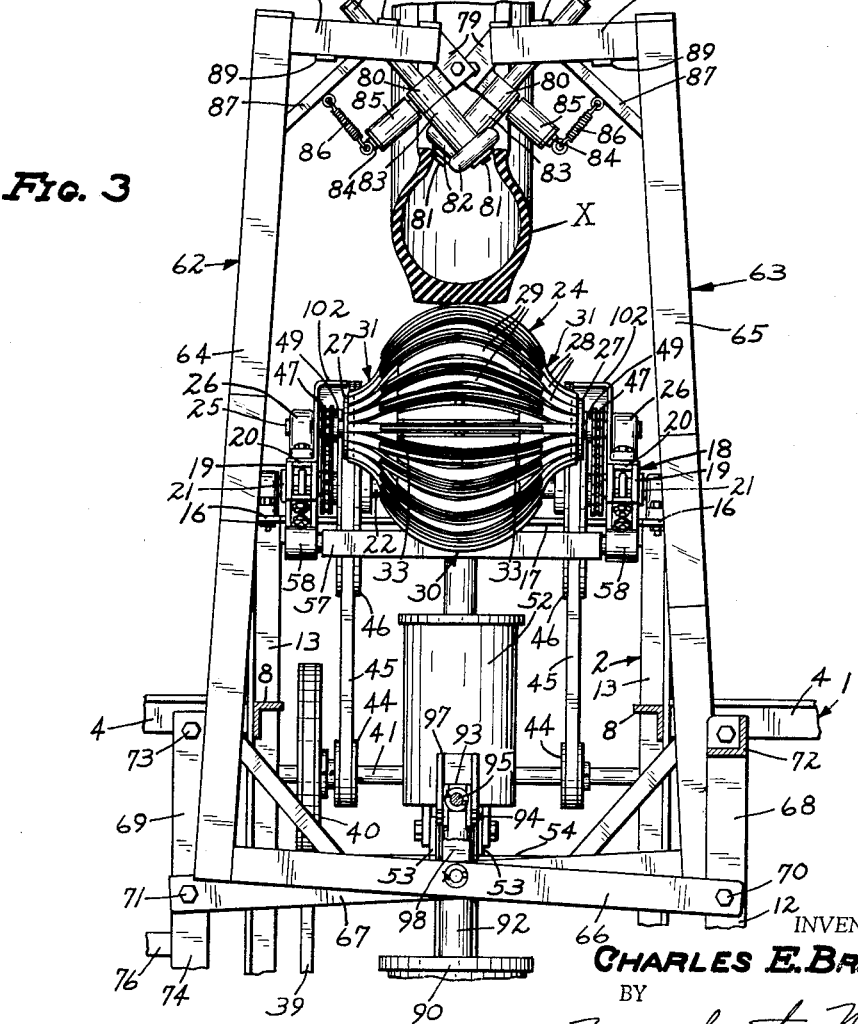
INVENTOR.
CHARLES E. BRANICK
BY
Merchant & Merchant
ATTORNEYS July 17, 1962  C. E. BRANICK  3,044,748
DEVICE FOR INVERTING PNEUMATIC TIRE CASINGS
Filed June 13, 1960  4 Sheets-Sheet 4

INVENTOR.
CHARLES E. BRANICK
BY
Merchant & Merchant
ATTORNEYS

United States Patent Office 3,044,748
Patented July 17, 1962

3,044,748
DEVICE FOR INVERTING PNEUMATIC TIRE CASINGS
Charles E. Branick, % Branick Manufacturing Co., P.O. Box 1937, Fargo, N. Dak.
Filed June 13, 1960, Ser. No. 35,497
6 Claims. (Cl. 254—50.3)

My invention relates generally to pneumatic tire inspecting devices and more particularly to such devices employed in the inverting of tire casings to facilitate inspection of the inner wall surfaces thereof.

An important object of my invention is the provision of a tire inverter which is operative to rotate a tire casing on its own axis and to simultaneously and completely invert successive circumferential portions thereof, whereby the entire inner wall surface of the tire casing may be inspected during a single revolution thereof, for ply separation, breaks or other injury to the tire fabric.

Another object of my invention is the provision of a tire inverter which is adapted for use with tires of various diameters and cross sectional sizes without the necessity of adjustment or replacement of various parts to accommodate tires of different sizes.

Another object of my invention is the provision of a tire inverter, as set forth, which is relatively simple and inexpensive to produce, which is highly efficient in operation, and which is rugged in construction and durable in use.

Still another object of my invention is the provision of a pair of opposed tire spreading arms, and novel means for mounting said arms for spreading movements in directions angularly disposed with respect to the axis of a tire being spread, whereby to facilitate inversion of the portion of the tire adjacent said spreader arms.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 2 is a view in side elevation as seen from the left with respect to FIG. 1, some parts being broken away and some parts being shown in section;

FIG. 3 is a fragmentary view corresponding to a portion of FIG. 1, but showing a different position of some of the parts;

FIG. 4 is a fragmentary view in plan of the spreader arms of my invention positions as shown in FIG. 3;

FIG. 8 is a fragmentary section taken substantially on the line 8—8 of FIG. 1.

Figure 1:
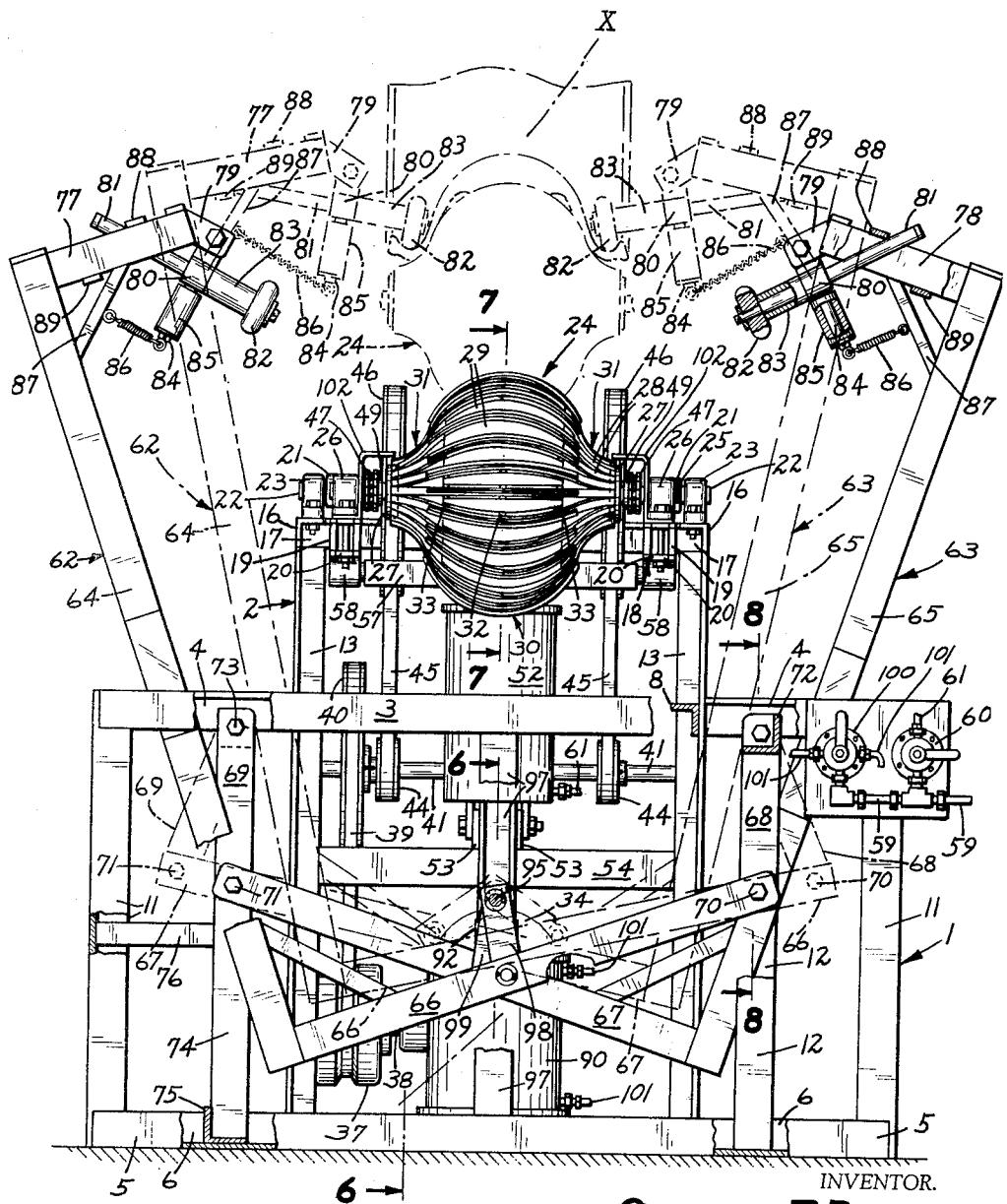
FIG. 1 is a view in front elevation of a device for inverting pneumatic tire casings, made in accordance with my invention, some parts being broken away and some parts being shown in section.
Figure 5:
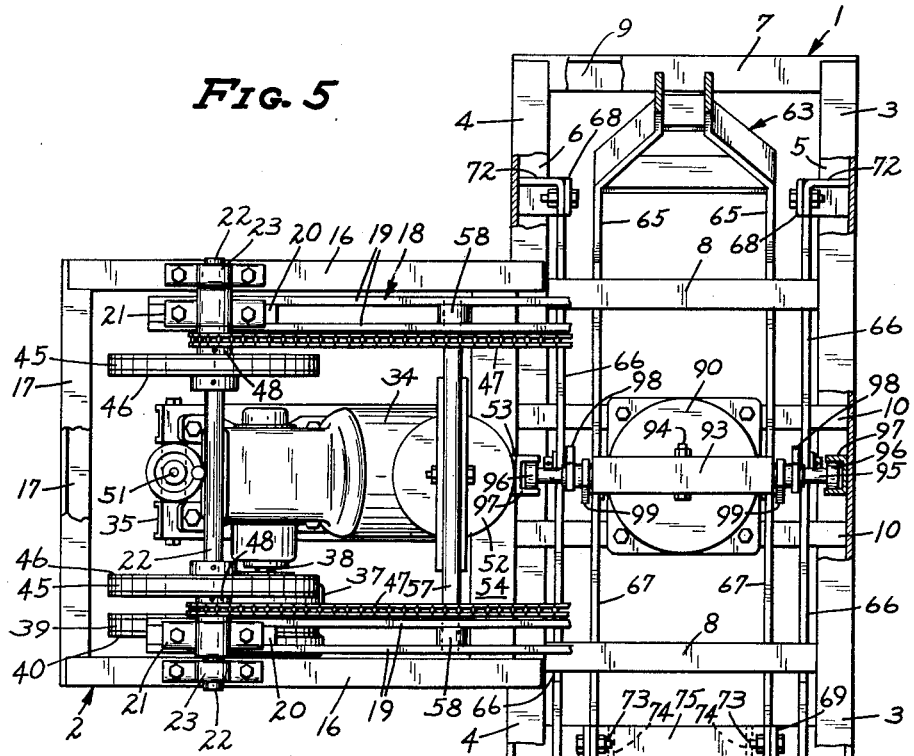
FIG. 5 is a view partly in plan and partly in horizontal section, taken substantially on the irregular line 5—5 of FIG. 2, some parts being broken away and some parts being shown in section.
Figure 6:
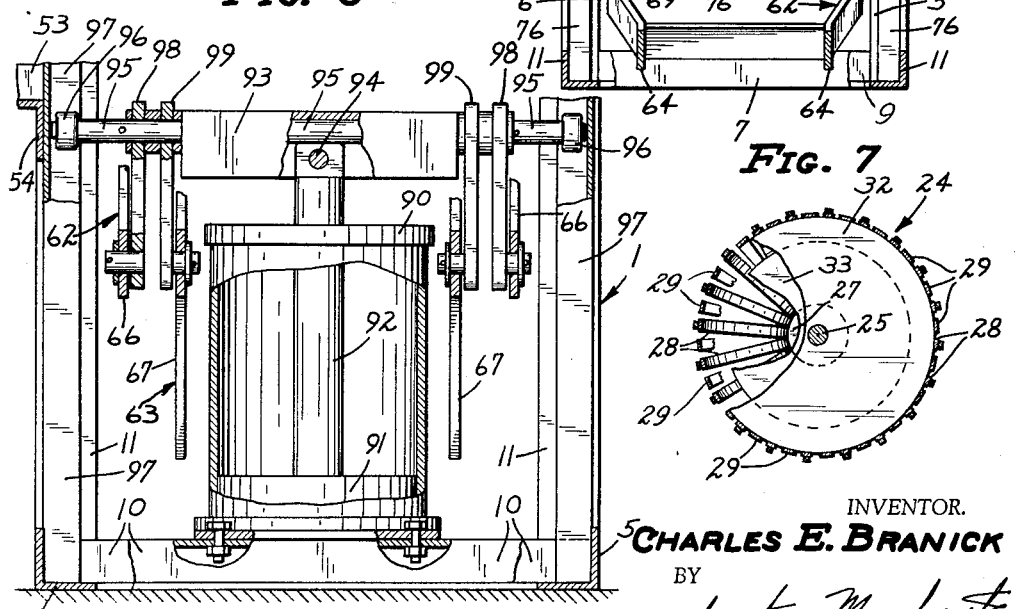
FIG. 6 is an enlarged fragmentary section taken on the line 6—6 of FIG. 1.

In the preferred embodiment of the invention illustrated, the frame structure is shown as comprising connected front and rear frames 1 and 2 respectively, the front frame 1 including elongated upper front and rear frame rails 3 and 4 respectively and lower front and rear frame rails 5 and 6 respectively, the upper frame rails 3 and 4 being connected at their outer ends by cross members 7, intermediate portions of the rail 3 being connected to the inner ends of the rail 4 by cross members 8. The opposite ends of the lower rails 5 and 6 are connected by cross members 9, the intermediate portions of said rails 5 and 6 being connected by a pair of cross members 10. Further, the upper frame rails 3 and 4 are supported in upwardly spaced relation from the lower frame rails 5 and 6 by vertically disposed legs 11 at the corners of the front frame 1, and by intermediate legs 12.

The rear frame 2 is of greater height than the front frame 1, and comprises a pair of laterally spaced vertically disposed front legs 13 that are welded or otherwise secured at their lower ends to the lower rear rail 6, and intermediate their ends to the inner ends of the upper rear rails 4. The frame 2 further includes rear legs 14 that are connected in rearwardly spaced relation to the front frame 1 by side frame members 15 at the lower ends of the legs 13 and 14, and by upper side frame members 16 that are connected to the upper ends of the legs 13 and 14. The rear ends of the side frame members 15 and 16, and the ends of the legs 14 are connected by cross frame members 17. Preferably, the various frame members and rails are constructed from commerically available angle iron and welded together to provide a rigid frame structure.

A sub-frame 18 comprises a pair of laterally spaced parallel side members 19, each side member 19 being bifurcated and provided at their opposite ends with spacer plates 20. At their rear ends, the side members 19 are provided with axially aligned bearings 21 which journal a rotary shaft 22 that in turn is rotatably mounted in other bearings 23 rigidly mounted on the rear end portions of the side side frame members 16. As shown, the shaft 22 is disposed on a horizontal axis extending transversely of the machine, whereby the front end of the sub-frame 18 is movable in an arcuate upward and downward direction. A rotary member 24 is journalled on the front end of the sub-frame 18 for rotation on an axis parallel to the axis of the shaft 22, said rotary member 24 comprising a shaft 25 that is journalled at its opposite ends in bearings 26 mounted on the front ends of the side members 19, a pair of axially spaced collars 27 keyed or otherwise rigidly secured to the shaft 25, a plurality of generally axially extending primary bars 28 welded or otherwise rigidly secured at their opposite ends to the collars 27, and a plurality of circumferentially spaced secondary bars 29 each disposed between a different pair of adjacent ones of the primary bars 28. The primary bars 28 are outwardly bowed or curved at their central portions, as indicated at 30, and recurved at their opposite end portions, as indicated at 31, adjacent the collars 27. Intermediate their ends, the primary bars 28 are braced by a central connector disk 32 and a pair of axially spaced similar connector disks 33, said connector disks 32 and 33 being welded to the interior portions of the bars 28. In like manner, the central portions and opposite ends of the secondary bars 29 are welded to the connector disks 32 and 33.

The rotary member 24 is adapted to engage the bottom road-engaging tread surface portion of a tire casing X, and to impart rotary movement to the tire casing X on an axis parallel to the axis of rotation of the rotary member 24, the relatively rough outer surface defined by the primary and secondary bars 28 and 29 providing the necessary traction to rotate the tire X. For the purpose of imparting rotary movement to the rotary member 24, I provide a motor 34 that is mounted on a base 35 pivotally mounted to the frame structure for generally upward and downward swinging movements, as indicated at 36. A variable pitch pulley 37 is mounted on the output shaft 38 of the motor 34, and has entrained thereover an endless belt 39 that is also entrained over a pulley 40 rigidly mounted on a jackshaft 41 that is journalled in suitable bearings 42. The bearings 42 are mounted on vertically disposed legs 43, one of which is shown, the legs 43 being welded or otherwise rigidly secured at their opposite ends to adjacent side frame members 15 and 16. As shown, the pulley 40 is of larger diameter than the maximum diameter of the variable pitch pulley 37, whereby a reduction in speed of the shaft 41 is obtained. Also rigidly mounted on the jackshaft 41 is a pair of relatively small diameter pulleys 44 over which are entrained endless drive belts 45 that are also entrained over relatively large diameter pulleys 46 rigidly mounted on the shaft 22. A pair of endless link chains 47 are entrained over cooperating sprockets 48 mounted fast on the shaft 22 and another pair of sprocket wheels 49 keyed or otherwise rigidly secured to the shaft 25 of the rotary member 24. The variable pitch pulley 37 is of the conventional type wherein the pitch is changed by varying the center distance between the motor shaft 38 and the jackshaft 41, whereby to vary the speed of the driven member, in this case the rotary member 24. For the purpose of varying the center distance between the motor shaft 38 and the jackshaft 41, I provide a pivoted nut 50 at the rear end of the motor base 35, through which is threaded a hand wheel equipped screw 51, the lower end of which engages the floor or ground, indicated at A, see FIG. 2.

For the purpose of supporting as well as imparting raising and lowering movements to the front end of the sub-frame 18, I provide a generally vertically disposed fluid pressure cylinder 52 that is pivotally connected at its lower end to bracket means 53 welded or otherwise secured to a cross bar 54 that extends transversely of and comprises a portion of the frame structure. A piston 55 is mounted in the cylinder 52 for reciprocatory movements therein, and is provided with a piston rod 56 that extends axially upwardly from the cylinder 52 and which is rigidly secured at its upper end to a cross shaft 57 that is journalled in suitable bearings 58 on the side members 19 of the sub-frame 18. Fluid under pressure is introduced to the lower end of the cylinder 52 from a suitable source, not shown, through a main conduit 59, a conventional three-way valve 60, and a branch conduit 61, see FIG. 1.

A pair of frame-like generally L-shaped spreader arms 62 and 63 comprise respective generally vertically extending portions 64 and 65 and respective generally horizontally extending portions 66 and 67 at the lower ends of the generally vertically extending portions 64 and 65 respectively. With reference particularly to FIGS. 1 and 3, it will be seen that the generally vertically disposed portions 64 and 65 of the spreader arms are each disposed at a different side portion of the front frame 1, their respective generally horizontal portions extending to the opposite side portions of the front frame 1. The free ends of the generally horizontally disposed arm portions 66 and 67 are pivotally secured to the lower end of depending supporting links 68 and 69 respectively, as indicated at 70 and 71 respectively, on horizontal axes normal to the direction of the axes of the rotary member 24. The upper ends of the links 68 are pivotally connected to bracket elements 72 at the upper ends of the intermediate legs 12 on aligned axes parallel to the aligned axes of the pivotal connections 70, the upper ends of the links 69 being pivotally connected, as indicated at 73, to the upper ends of vertically disposed legs 74 that are welded or otherwise rigidly secured at their lower ends to a cross member 75 of the front frame 1. The legs 74 are braced intermediate their ends by a horizontally disposed generally U-shaped brace member 76. With reference to FIG. 2, it will be seen that the aligned axes of the pivotal connections 73 are parallel to the aligned axes of the pivotal connections 71 and to the axes of the pivotal connections 70 and 72.

At their upper ends, the spreader arm portions 64 and 65 are provided with laterally inwardly extending bracket members 77 and 78 respectively, the spreader arms 62 being provided with a spaced pair of the bracket members 77 and the spreader arms 63 being provided with a single bracket member 78, the bracket member 78 overlying the axis of the rotary member 24, and the bracket members 77 being disposed in vertical planes at opposite sides of the axis of the rotary member 24 and parallel thereto. The bracket members 77 and 78 are each provided with pairs of spaced ears 79 between which are pivotally secured mounting heads 80, for swinging movements on generally horizontal axes parallel to the axes of swinging movement of the several spreader arm supporting links 68 and 69. The mounting heads 80 are each provided with rigid shafts 81 that extend in opposite directions therefrom, and on the inner ends of which are journalled bead-engaging rollers 82. Other bead-engaging rollers 83, of cylindrical shape and of smaller diameter than the tire bead-engaging rollers 82, are also journalled on the shafts 81 intermediate the tire bead-engaging rollers 82 and their respective mounting heads 80. Rigid stub-shafts 84 extend generally outwardly and downwardly from the mounting heads 80 in directions normal to the axes of their respective shafts 81, and have journalled thereon generally cylindrical rollers 85 that are adapted to make rolling engagement with the outer surface portions of the tire adjacent the beads thereof. The mounting heads 80, together with their respective shafts and rollers, are yieldingly urged in one direction of swinging movement thereof by coil tension springs 86 anchored at one of their ends to respective stub-shafts 84, and at their other ends to brace members 87 on their respective spreader arms 62 and 63. Stop bars 88 on the bracket members 77 and 78 engage outer end portions of the shafts 81 to limit swinging movement thereof in a direction imparted thereto by the springs 86, and other stop bars 89 engage said outer end portions of the shafts 81 to limit swinging movement of the mounting heads 80 and parts carried thereby in the opposite direction.

A vertically extending fluid pressure cylinder 90 is bolted or otherwise rigidly secured at its lower end to the cross members 10 of the front frame 1, and is provided with a cooperating piston 91 having an upwardly extending piston rod 92 that is secured at its upper end to a crosshead 93, by means of a nut-equipped bolt or the like 94. The crosshead 93 includes a shaft 95 to the opposite ends of which are journalled rollers 96 which travel in opposed vertical guide channels 97 rigidly secured to the front frame 1. Rigid lifting links 98 and 99 are pivotally mounted at their upper ends to the shaft 95 outwardly of opposite ends of the crosshead 93, the lower ends of the links 98 and 99 being pivotally secured to respective ones of the horizontally extended portions 66 and 67 of the spreader arms 62 and 63. It will be noted that the axis of the shaft 95 and the axes of pivotal connection of the links 98 and 99 to their respective spreader arm portions 66 and 67, are parallel to the above mentioned axes of pivotal connection of the links 68 and 69 to the front frame 1 and their respective horizontally disposed spreader arm portions 66 and 67.

Fluid under pressure is directed to the cylinder 90 to raise or lower the piston 91, whereby to impart laterally outward and downward spreading movements to the spreader arms 62 and 63 or to move the same toward each other, from a suitable source of fluid under pressure, not shown, through the conduit 59, a conventional three-way valve 100, and selected ones of a pair of branch conduits 101 extending from the three-way valve 100 to the cylinder 90. When the spreader arms 62 and 63, as well as the rotary member 24, are in their full line positions of FIG. 1, a tire X is placed upon the rotary member 24 and manually held thereon with the axis of the tire in overlying parallel relationship to the axis of the rotary member 24. The valve 100 is then manipulated to cause fluid under pressure to be introduced to the lower end of the cylinder 90 whereby to raise the piston 91 and move the spreader arms 62 and 63 inwardly and upwardly to their positions of FIG. 3. The valve 60 is then manipulated to introduce fluid under pressure to the lower end of the cylinder 52 whereby to raise the rotary element 24 until the bead-engaging rollers 81 and 82 are disposed between the beads of the tire X. Thereafter, the spreader arms 62 and 63 are caused to swing laterally outwardly and downwardly to spread the beads of the tire X, and the rotary member 24 raised, all as indicated by dotted lines in FIG. 1, so that the portion of the tire X engaged by the bead engaging rollers 81 and 82 is completely inverted, as shown by dotted lines in FIG. 1. A pair of guard elements 102 are secured to the front ends of the side members 19 of the sub-frame 18, so that the guard elements overlie the sprockets 49 to prevent the tire beads from rubbing against the sprocket engaged front end portions of the link chains 47. With the roller engaged portions of the tire X in its inverted condition, the motor 34 is energized to cause rotation to be imparted to the rotary member 24, and through said rotary member to the tire X, the tire is progressively inverted and successively released from inversion as rotation is imparted thereto. Thus, the entire interior surface of the tire X may be readily inspected for flaws, ply separation, or any damage that may be present.

Figure 7:
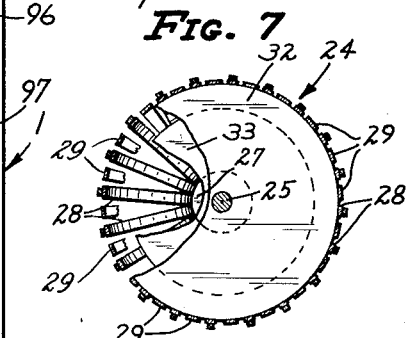
FIG. 7 is an enlarged fragmentary detail in section, taken on the line 7—7 of FIG. 1.

With reference to FIGS. 2 and 7, it will be noted that the primary bars 28 of the rotary member 24 describe a circle of greater diameter than do the secondary bars 29. With this arrangement, sufficient traction is had between the rotary member 24 and the tread surface portion of the tire X to properly rotate the tire X when the rotary member engaged portion thereof is inverted. Further, the spaced arrangement of the rollers 82 associated with the spreader arm 62 in a direction generally circumferentially of the tire X, together with the inverted relationship of the tire over the rotary member 24 effectively prevents the tire from being displaced from its position in overlying relationship to the rotary member 24 during rotation of the tire. The pivotal connections of the mounting heads 80 to their respective bracket members 77 and 78, and the range of generally vertical movement of the rotary member 24, enables the machine to easily accommodate and invert tires over a wide range of cross-sectional sizes, without the necessity of special adapters or of altering the construction of the machine to accommodate various sized tires.

While I have shown and described a commercial embodiment of my tire inverting machine, it will be understood that the same is capable of modification, and that modification may be made without departure from the spirit and scope of the invention, as defined in the claims.

What I claim is:

1. In a device for inverting pneumatic tire casings; a frame structure; a sub-frame; shaft means pivotally mounting said sub-frame at one end to said frame structure for generally upward and downward swinging movements on a horizontal axis; a rotary member journalled on the opposite end of said sub-frame for rotation on an axis parallel to the axis of said shaft means and having an arcuate crown portion adapted to engage the bottom road engaging tread surface portion of a tire casing with the axis of said tire casing parallel to the axis of rotation of said rotary member and opposite end portions adapted to engage and support the side wall portions of the tire casing adjacent the beads thereof; means including said shaft means and power transmission mechanism on on said sub-frame for imparting rotary movement to said rotary member to rotate a tire supported thereby on its own axis; a pair of opposed spreader arms; generally opposed tire bead engaging elements; means mounting said bead-engaging elements on said spreader arms; means mounting said spreader arms on said frame for movements in vertical planes parallel to the axis of rotation of said rotary member and in angularly outward and downward directions from said first positions wherein said bead-engaging elements overlie the central portion of said rotary member, to second positions laterally outwardly and downwardly spaced from said first positions, whereby to spread the tire bead portion engaged by said elements; and means for imparting upward swinging movements to said sub-frame to raise said rotary member relative to said bead-engaging elements to invert the portion of the tire engaged thereby when the adjacent bead portions of the tire are in a spread condition, whereby the side wall portions of the tire casing adjacent the beads thereof engage the end portions of said rotary member.

2. The structure defined in claim 1 in which said rotary member comprises a plurality of circumferentially spaced generally axially extending bars outwardly bowed at their central portions, and means rigidly interconnecting said bars at the opposite ends thereof.

3. The structure defined in claim 1 in which said rotary member comprises a plurality of circumferentially spaced generally axially extending bars outwardly bowed at their central portions, a plurality of outwardly bowed secondary bars one each disposed between a different pair of adjacent ones of said first mentioned bars, a pair of axially spaced connector elements secured at opposite ends of said secondary bars and to intermediate portions of said first mentioned bars, a pair of annular mounting collars one at each end of said first mentioned bars and to which said first mentioned bars are secured, and a shaft extending axially through said collars and rigidly secured thereto.

4. In a device for inverting pneumatic tire casings, a frame structure, a rotary member journalled in said frame structure for rotation on a horizontal axis and having an arcuate crown portion adapted to engage the bottom road engaging tread surface portion of a tire casing with the axis of the tire casing parallel to the axis of rotation of said rotary member, said rotary member having its opposite end portions shaped to engage the side walls of said tire casing adjacent the beads of said casing, means for imparting rotary movement to said rotary member to rotate the tire on its own axis, a pair of opposed spreader arms having tire bead-engaging elements thereon and movable between tire bead-engaging positions and bead spreading positions laterally outwardly and downwardly spaced from said tire bead-engaging positions, and means for raising said rotary member relative to said bead-engaging elements to invert the tread portion of the tire engaged thereby when the adjacent bead portions are in a spread apart condition, whereby said side wall portions of the tire casing engage the end portions of said rotary member, said rotary member comprising a shaft and a plurality of circumferentially spaced generally axially extending bars outwardly bowed at their central portions and operatively connected at their opposite ends to said shaft.

5. The structure defined in claim 4 in which said rotary member further includes a pair of annular collars through which said shaft extends, the opposite end portions of said bars being recurved and anchored to adjacent ones of said collars, a pair of axially spaced connector disks disposed intermediate said collars and secured to intermediate outwardly bowed portions of said bars, and a plurality of outwardly bowed secondary bars one each disposed between a different pair of adjacent ones of said first-mentioned bars and anchored at their opposite ends to said connector disks.

6. In a device for inverting pneumatic tire casings; a frame structure; a rotary member journalled in said frame structure for rotation on a horizontal axis and having an arcuate crown portion adapted to engage the bottom road-engaging tread surface portion of a tire casing with the axis of the tire casing parallel to the axis of rotation of said rotary member; means for imparting rotary movement to said rotary member to rotate the tire on its own axis; a pair of opposed spreader arms; generally opposed tire bead-engaging rollers; roller supporting members mounted on said spreader arms for pivotal movements on generally horizontal axes normal to the direction of the axis of said bead-engaging rollers and to the direction of the axes of rotation of said rotary member, stop means limiting pivotal movements of said roller supporting members in opposite directions, yielding means biasing said roller supporting members in one direction of pivotal movement thereof; means mounting said spreader arms on said frame for movements in vertical planes parallel to the axis of rotation of said rotary member and in angularly outward and downward directions from first positions, wherein said bead-engaging elements overlie the central portion of said rotary member, to second positions laterally outwardly and downwardly spaced from said first positions, whereby to spread the tire bead portions engaged by said elements; and means for raising said rotary member relative to said bead-engaging rollers to invert the portion of the tire engaged thereby when the adjacent bead portions thereof are in a spread apart condition.

References Cited in the file of this patent
UNITED STATES PATENTS

| | | |
|---|---|---|
| 1,697,708 | Blackmon | Jan. 1, 1929 |
| 1,886,834 | Prentice et al. | Nov. 8, 1932 |
| 2,895,711 | Branick | July 21, 1959 |